June 4, 1940.　　　　O. J. SIMLER　　　　2,202,968
LINE CLAMP
Filed April 5, 1939
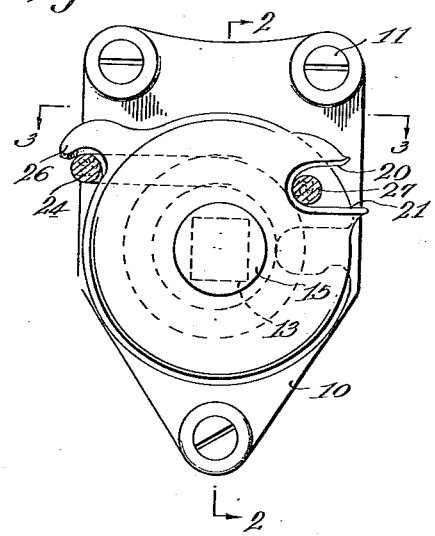
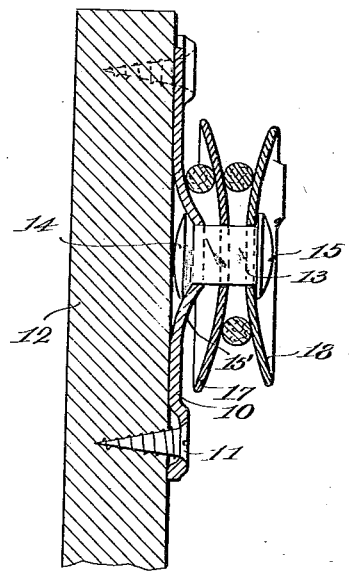
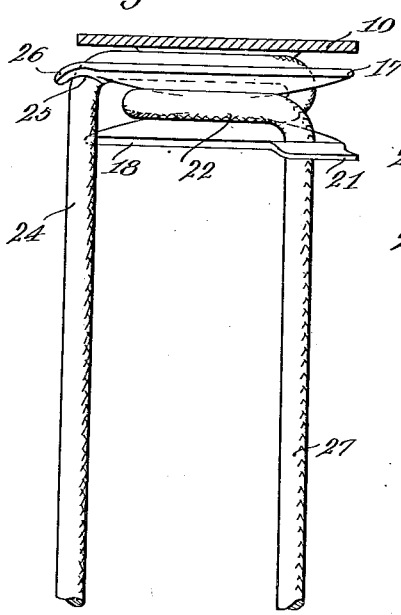
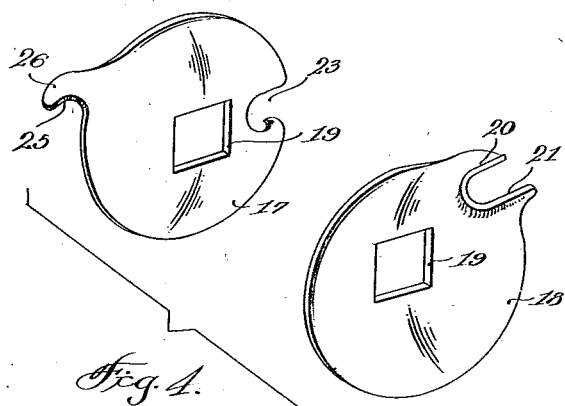
Oscar J. Simler
INVENTOR
BY Victor J. Evans & Co.
ATTORNEYS Patented June 4, 1940

2,202,968

UNITED STATES PATENT OFFICE 2,202,968

LINE CLAMP

Oscar J. Simler, Sebring, Ohio, assignor of one-half to Mary Calderone, Sebring, Ohio Application April 5, 1939, Serial No. 266,170

1 Claim. (Cl. 24—127)

The invention relates to a line clamp and more especially to clothes line fasteners.

The primary object of the invention is the provision of a fastener of this character, wherein the same when mounted upon a support and having a clothes line engaged thereon will be firmly fastened without requiring the tying of a knot and such line will be maintained tight without liability of slippage during the use thereof when hanging clothes.

Another object of the invention is the provision of a fastener of this character, wherein the clothes line can be wrapped or turned about the same and when so engaged will be firmly and securely held and such line can be disposed at any angle or in any direction required without liability of the slipping of the line from the fastener.

A further object of the invention is the provision of a fastener of this character, wherein the line can be readily removed at will and such line is not in any manner mutilated in the fastening thereof, knots being entirely dispensed with for the fastening of the line in place.

A still further object of the invention is the provision of a fastener of this character, which is simple in its construction, thoroughly reliable and efficient in operation, readily and easily applied and removed at will, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is an elevation of a fastener constructed in accordance with the invention.

Figure 2 is a sectional view taken on the line 2—2 of Figure 1 looking in the direction of the arrows.

Figure 3 is a sectional view on the line 3—3 of Figure 1 looking in the direction of the arrows.

Figure 4 is a perspective exploded view of the companion clamping members of the fastener.

Similar reference characters indicate corresponding parts throughout the several views in the drawing.

Referring to the drawing in detail, the fastener constituting the present invention comprises a base plate 10 made from sheet metal and of the required size and shape having suitable clearances for fasteners 11 which secure the device upon a support, as, for example upon a wall, a portion thereof being indicated at 12. Fitted with this plate 10 is a stud 13, being square faced and has heads 14 and 15, respectively, the head being seated in an out-struck annular bulged portion 15' protruding from the plate 10. Upon this stud 13 is supported the inner and outer concavo convex or dished clamping members 17 and 18, respectively, both being of circular contour and the outer member 18 is reversely dished to the inner member 17. These members are loosely fitted for sliding movement on the stud 13 and are formed with the squared matching center holes 19 for the said square faced stud 13 accommodated in said holes.

In the outer member 18 is a notch 20 extending through the periphery of said member and the edge of this notch is turned outwardly, as at 21, for the seating of a clothes line, rope or the like 22 therein, which line, rope or the like is coiled between the members 17 and 18 and threaded through a bayonet shaped slot 23 formed in the member 17 for further twirling between the said member 17 and the base plate 10, the coils being carried about the stud 13 with one stretch 24 of the line, rope or the like seated in a seat 25 of a horn or ear 26 projecting from the periphery of the member 17. When tension is had upon the other stretch 27 of the line, rope or the like, the coils between the members 17 and 18 and also between the member 17 and the base plate 10 will become wedged so that the line, rope or the like will be held taut and secure without liability of slippage and avoiding the necessity of knotting or tying the line, rope or the like. The line, rope or the like can be fastened in a simple manner and with dispatch being also readily unfastened when the occasion requires and in the use of the fastener the said line, rope or the like will not become mutilated, thereby increasing the life of the same in association with the fastener hereinbefore set forth.

By the use of the fastener, double stretches of the line in parallel relation to each other and spaced from one another can be accomplished, as will be apparent in Figure 3 of the drawing.

The fastener is susceptible of use for disposing the line, rope or the like at any angle or in different directional courses in the hanging thereof for service.

What is claimed is:

A fastener for a cable comprising a non-circular supporting stud, non-rotatable reversely disposed substantially concavo-convex circular-shaped members loose upon said shaft and independent from each other for relative sliding movements, and a base plate fixedly carrying said stud and coacting with the innermost member whereby the cable will be clamped between said members and between the innermost member and the said base, both of said members being provided with peripheral notches for the training of the cable laterally and outwardly of said members and the looping of the said cable between said members and also between the base plate and the innermost of said members.

OSCAR J. SIMLER.